United States Patent
Naoi

(10) Patent No.: US 11,348,612 B2
(45) Date of Patent: May 31, 2022

(54) ε-IRON OXIDE POWDER, COMPOSITION INCLUDING THE SAME, MAGNETIC RECORDING MEDIUM, AND MAGNETIC RECORDING AND REPRODUCING DEVICE

(71) Applicant: FUJIFILM Corporation, Tokyo (JP)

(72) Inventor: Kenji Naoi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 62 days.

(21) Appl. No.: 16/832,629

(22) Filed: Mar. 27, 2020

(65) Prior Publication Data
US 2020/0312359 A1 Oct. 1, 2020

(30) Foreign Application Priority Data

Mar. 28, 2019 (JP) .............................. JP2019-064069

(51) Int. Cl.
*G11B 5/706* (2006.01)
*G11B 5/714* (2006.01)

(52) U.S. Cl.
CPC .......... *G11B 5/70642* (2013.01); *G11B 5/714* (2013.01)

(58) Field of Classification Search
CPC ... G11B 5/70642; G11B 5/714; G11B 5/7021; G11B 5/70647; G11B 5/7356
See application file for complete search history.

(56) References Cited

U.S. PATENT DOCUMENTS

| | | | |
|---|---|---|---|
| 2005/0214593 A1* | 9/2005 | Dousita | C08J 7/0423 428/842.5 |
| 2008/0057352 A1 | 3/2008 | Ohkoshi et al. | |
| 2016/0064025 A1 | 3/2016 | Kurokawa et al. | |
| 2018/0033528 A1 | 2/2018 | Sakane et al. | |
| 2019/0027182 A1 | 1/2019 | Ozawa | |

FOREIGN PATENT DOCUMENTS

| | | | |
|---|---|---|---|
| CN | 101178965 A | | 5/2008 |
| JP | 2008063199 A | * | 3/2008 |
| JP | 2016-051493 A | | 4/2016 |
| JP | 2016-169148 A | | 9/2016 |
| JP | 2017-122044 A | | 7/2017 |
| JP | 2019-021357 A | | 2/2019 |

OTHER PUBLICATIONS

English Machine Translation: Ogoshi (JP 2008-063199) (Year: 2008).*
Office Action dated Dec. 7, 2021 from the Japanese Patent Office in JP Application No. 2019-064069.

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The ε-iron oxide powder has an average particle size in a range of 5.0 to 16.0 nm and an uneven distribution of an M atom in a surface layer portion, in which the M atom is one or more kinds of atoms selected from the group consisting of an aluminum atom and an yttrium atom, and a content of the M atom with respect to 100 atom % of iron atoms is in a range of 4.0 to 9.5 atom %.

20 Claims, No Drawings

ε-IRON OXIDE POWDER, COMPOSITION INCLUDING THE SAME, MAGNETIC RECORDING MEDIUM, AND MAGNETIC RECORDING AND REPRODUCING DEVICE

CROSS-REFERENCE TO RELATED APPLICATIONS

This application claims priority under 35 U.S.C. 119 to Japanese Patent Application No. 2019-064069 filed on Mar. 28, 2019. The above application is hereby expressly incorporated by reference, in its entirety, into the present application.

BACKGROUND OF THE INVENTION

1. Field of the Invention

The present invention relates to an ε-iron oxide powder, a composition including the same, a magnetic recording medium, and a magnetic recording and reproducing device.

2. Description of the Related Art

In recent years, as a ferromagnetic powder used in a magnetic recording medium, an ε-iron oxide powder is attracting attention (for example, see JP2017-122044A).

SUMMARY OF THE INVENTION

In general, a magnetic recording medium runs in a magnetic recording and reproducing device to bring a surface of a magnetic layer and a magnetic head into contact to slide on each other, and accordingly, the data recorded on the magnetic recording medium is read and reproduced by the magnetic head. As one performance required for the magnetic recording medium, excellent electromagnetic conversion characteristics can be exhibited, in a case of reproducing the data recorded on the magnetic recording medium as described above.

In addition, the magnetic recording medium is recently used in various environments. As one aspect of a use environment of the magnetic recording medium, a high temperature and high humidity environment is used.

In consideration of these circumstances, the inventors have conducted research regarding electromagnetic conversion characteristics of a magnetic recording medium including an ε-iron oxide powder in a magnetic layer. As a result, the inventors have thought that further improvement of an ε-iron oxide powder of the related art is desired, from a viewpoint of providing a magnetic recording medium having both excellent electromagnetic conversion characteristics in an initial stage of running and excellent electromagnetic conversion characteristics after repeated running in a high temperature and high humidity environment.

An object of one aspect of the invention is to provide an ε-iron oxide powder usable in manufacturing of a magnetic recording medium having both excellent electromagnetic conversion characteristics in an initial stage of running and electromagnetic conversion characteristics after repeated running in a high temperature and high humidity environment.

According to one aspect of the invention, there is provided an ε-iron oxide powder having an average particle size in a range of 5.0 to 16.0 nm, and an uneven distribution of an M atom in a surface layer portion, in which the M atom is one or more kinds of atoms selected from the group consisting of an aluminum atom and an yttrium atom, and a content of the M atom with respect to 100 atom % of iron atoms is in a range of 4.0 to 9.5 atom %.

In one aspect, the content of the M atom may be in a range of 4.3 to 8.0 atom %.

In one aspect, the average particle size may be in a range of 6.0 to 16.0 nm.

In one aspect, the ε-iron oxide powder may further include one or more kinds of atoms selected from the group consisting of a gallium atom, a cobalt atom, and a titanium atom.

In one aspect, the ε-iron oxide powder may include at least an aluminum atom as the M atom.

In one aspect, the ε-iron oxide powder may include at least an yttrium atom as the M atom.

In one aspect, the ε-iron oxide powder may be a ferromagnetic powder for magnetic recording.

According to another aspect of the invention, there is provided a magnetic recording medium including: a non-magnetic support; and a magnetic layer including a ferromagnetic powder, in which the ferromagnetic powder is the ε-iron oxide powder.

In one aspect, the magnetic recording medium may further include a nitrogen-containing polymer in the magnetic layer.

In one aspect, the magnetic recording medium may further include a non-magnetic layer including a non-magnetic powder between the non-magnetic support and the magnetic layer.

In one aspect, the magnetic recording medium may further include a back coating layer including a non-magnetic powder on a surface of the non-magnetic support opposite to a surface provided with the magnetic layer.

According to another aspect of the invention, there is provided a magnetic recording and reproducing device comprising: the magnetic recording medium; and a magnetic head.

According to still another aspect of the invention, there is provided a composition including the ε-iron oxide powder.

In one aspect, the composition may include a binding agent.

According to one aspect of the invention, it is possible to provide an ε-iron oxide powder usable in manufacturing of a magnetic recording medium and a composition including the same having both excellent electromagnetic conversion characteristics in an initial stage of running and electromagnetic conversion characteristics after repeated running in a high temperature and high humidity environment. In addition, according to one aspect of the invention, it is possible to provide a magnetic recording medium including the ε-iron oxide powder in the magnetic layer, and a magnetic recording and reproducing device including the magnetic recording medium.

DESCRIPTION OF THE PREFERRED EMBODIMENTS

ε-Iron Oxide Powder

One aspect of the invention relates to an ε-iron oxide powder having an average particle size in a range of 5.0 to 16.0 nm and an uneven distribution of an M atom in a surface layer portion, in which the M atom is one or more kinds of atoms selected from the group consisting of an aluminum atom and an yttrium atom, and a content of the M atom with respect to 100 atom % of iron atoms is in a range of 4.0 to 9.5 atom %.

The inventors have surmised that the average particle size of the ε-iron oxide powder in the range described above contributes to improvement of electromagnetic conversion characteristics (specifically, electromagnetic conversion characteristics in an initial stage of the running) of the magnetic recording medium. The inventors have surmised that the content of the M atom which is one or more kinds of atoms selected from the group consisting of an aluminum atom and an yttrium atom in the range described above included in the ε-iron oxide powder contributes to improvement of electromagnetic conversion characteristics of the magnetic recording medium in an initial stage of the running and after repeated running in a high temperature and high humidity environment. In addition, the inventors have thought that the uneven distribution of such an M atom in the surface layer portion contributes to improvement of electromagnetic conversion characteristics after repeated running in a high temperature and high humidity environment. It is surmised that this is because the uneven distribution of the M atom in the surface layer portion contributes to an increase in affinity between the ε-iron oxide powder and other components included in the magnetic layer. As a result, the strength of the magnetic layer increases and thus, the chipping of the surface of the magnetic layer hardly occurs, even in a case where the sliding with the magnetic head is repeated in the high temperature and high humidity environment. The inventors have though that this can prevent a deterioration in electromagnetic conversion characteristics due to occurrence of spacing loss due to chippings of the surface of the magnetic layer. However, the above description is merely a surmise the invention is not limited. In addition, the invention is not limited to other surmises disclosed in the specification either.

JP2017-122044A discloses that Al and/or Y hydroxide coating is provided on ε-$Fe_2O_3$ or ε type iron-based oxide magnetic particle powder (paragraph 0013 of JP2017-122044A and the like), but does not disclose the ε-iron oxide powder having the average particle size described above, the content of the M atom described above, and the uneven distribution of an M atom in a surface layer portion. In addition, JP2017-122044A does not disclose suggestion relating to a magnetic recording medium capable of exhibiting excellent electromagnetic conversion characteristics both in an initial stage of the running and after repeated running in a high temperature and high humidity environment.

Hereinafter, the ε-iron oxide powder will be described in more detail.

In the invention and the specification, the "ε-iron oxide powder" is a ferromagnetic powder having an ε-iron oxide type crystalline structure detected as a main phase by an X-ray diffraction analysis. For example, in a case where the diffraction peak of the highest hardness in the X-ray diffraction spectrum obtained by the X-ray diffraction analysis belongs to the ε-iron oxide type crystalline structure, it is determined that the ε-iron oxide type crystalline structure is detected as a main phase. The ε-iron oxide powder in the invention and the specification includes a so-called unsubstituted ε-iron oxide powder configured with an iron atom and an oxygen atom, and a so-called substituted ε-iron oxide powder including one or more kinds of substitutional atom for substituting an iron atom.

In the invention and the specification, the "uneven distribution of an M atom in a surface layer portion" indicates that a ratio of a "surface layer portion content (with respect to bulk iron atom)" of the M atom to a "bulk content" described below (surface layer portion content (with respect to bulk iron atom)/bulk content) is equal to or greater than 0.90. Satisfying such a ratio means that a large amount of the M atom is present (that is, unevenly distributed) in the surface layer portion of the particles configuring the ε-iron oxide powder. The ratio can be equal to or greater than 0.92 and can also be equal to or greater than 0.94. In addition, the ratio can be, for example, equal to or smaller than 1.00.

Regarding the M atom, the "surface layer portion content" (with respect to bulk iron atom)" is a content of the M atom (surface layer portion M atom) in a solution obtained by partially dissolving the ε-iron oxide powder with acid with respect to 100 atom % of iron atom (bulk iron atom) in a solution obtained by totally dissolving the ε-iron oxide powder with acid. Meanwhile, the "bulk content" is a content of the M atom (bulk M atom) in a solution obtained by totally dissolving the ε-iron oxide powder with acid with respect to 100 atom % of iron atom (bulk iron atom) in a solution obtained by totally dissolving the ε-iron oxide powder with acid. Unless otherwise noted, the content of various atoms included in the ε-iron oxide powder is the "bulk content".

The "surface layer portion content (with respect to surface layer portion iron atom)" which will be described later is a content of the M atom (surface layer portion M atom) in a solution obtained by partially dissolving the ε-iron oxide powder with acid with respect to 100 atom % of iron atom (surface layer portion iron atom) in a solution obtained by partially dissolving the ε-iron oxide powder with acid.

The partial dissolving and the total dissolving of the ε-iron oxide powder will be described below. Regarding the ε-iron oxide powder present as the powder, sample powder for the partial dissolving and the total dissolving are collected from powder of the same batch. Meanwhile, regarding the ε-iron oxide powder included in a magnetic layer of a magnetic recording medium, a part of the ε-iron oxide powder extracted from the magnetic layer is subjected to the partial dissolving and the other part is subjected to the total dissolving. The extraction of the ε-iron oxide powder from the magnetic layer can be performed by a method disclosed in a paragraph 0032 of JP2015-091747A.

The partial dissolving is performed by the following method. By the following method, a region of the particles configuring the ε-iron oxide powder which is 1% to 20% by mass with respect to 100% by mass of a total of the particles can be dissolved.

A vessel (for example, beaker) containing 12 mg of sample powder and 10 mL of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. In a case where two kinds of M atoms (that is, an aluminum atom and an yttrium atom) are detected from the element analysis, a total content of the entirety of the M atoms is the surface layer portion content. The same applies to the bulk content.

Meanwhile, the total dissolving means dissolving performed until the remaining ε-iron oxide powder in the solution is not visually confirmed after the completion of the dissolving. The total dissolving is performed by the following method. However, dissolving conditions such as the amount of sample powder and the like described below are merely examples, and dissolving conditions capable of performing the total dissolving can be randomly used.

A vessel (for example, beaker) containing 12 mg of sample powder and 10 mL of hydrochloric acid having a concentration of 4 mol/L is held on a hot plate at a set temperature of 80° C. for 3 hour. After that, the partial dissolving is performed in the same manner.

Content of M Atom

The content (bulk content) of the M atom in the ε-iron oxide powder is in a range of 4.0 to 9.5 atom % with respect to 100% of iron atom. From a viewpoint of further improving the electromagnetic conversion characteristics (particularly, electromagnetic conversion characteristics after repeated running in a high temperature and high humidity environment), the content of M atom is preferably equal to or greater than 4.3 atom %, more preferably equal to or greater than 4.5 atom %, and even more preferably equal to or greater than 4.7 atom %. In addition, from a viewpoint of further improving the electromagnetic conversion characteristics (particularly, electromagnetic conversion characteristics in an initial stage of the running), the content of M atom is preferably equal to or smaller than 9.3 atom %, more preferably equal to or smaller than 9.0 atom %, even more preferably equal to or smaller than 8.7 atom %, still preferably equal to or smaller than 8.5 atom %, still more preferably equal to or smaller than 8.3 atom %, still even more preferably equal to or smaller than 8.0 atom %, still further preferably equal to or smaller than 7.7 atom %, still further more preferably equal to or smaller than 7.5 atom %, still even further more preferably equal to or smaller than 7.3 atom %, and particularly preferably equal to or smaller than 7.0 atom %. The content of M atom in the ε-iron oxide powder can be adjusted by a composition of a raw material mixture used in the manufacturing of the ε-iron oxide powder.

The ε-iron oxide powder may have the content (bulk content) of M atom in the range described above and have the uneven distribution of an M atom in a surface layer portion, and the surface layer portion content (with respect to the bulk iron atom) and the surface layer portion content (with respect to the surface layer portion iron atom) of the M atom obtained by the method described above are not particularly limited.

In one aspect, the surface layer portion content of M atom (with respect to the surface layer portion iron atom) can be, for example, equal to or greater than 50 atom %, equal to or greater than 60 atom %, or equal to or greater than 70 atom %. In one aspect, the surface layer portion content of M atom (with respect to the surface layer portion iron atom) can be, for example, equal to or smaller than 100 atom %, equal to or smaller than 95 atom %, or equal to or smaller than 90 atom %.

In one aspect, the surface layer portion content of M atom (with respect to the bulk iron atom) can be, for example, equal to or greater than 2.0 atom %, equal to or greater than 3.0 atom %, or equal to or greater than 3.5 atom %. In one aspect, the surface layer portion content of M atom (with respect to bulk iron atom) can be, for example, equal to or smaller than 15.0 atom %, equal to or smaller than 12.5 atom %, or equal to or smaller than 9.5 atom %.

The ε-iron oxide powder having the uneven distribution of an M atom in a surface layer portion can be produced by performing an adhering treatment of adhering a compound of M atom on a surface of the particles configuring the ε-iron oxide powder. The adhering treatment will be further described.

Average Particle Size

The average particle size of the ε-iron oxide powder is in a range of 5.0 to 16.0 nm. From a viewpoint of further improving the electromagnetic conversion characteristics (particularly electromagnetic conversion characteristics in an initial stage of running), the average particle size of the ε-iron oxide powder is preferably equal to or greater than 5.5 nm, more preferably equal to or greater than 6.0 nm, even more preferably equal to or greater than 6.5 nm, still preferably equal to or greater than 7.0 nm, still more preferably equal to or greater than 7.5 nm, still even more preferably equal to or greater than 8.0 nm, still further more preferably equal to or greater than 8.5 nm, and still even further more preferably equal to or greater than 9.0 nm. In addition, from a viewpoint of further improving the electromagnetic conversion characteristics in an initial stage of running and after repeated running in high temperature and high humidity environment, the average particle size of the ε-iron oxide powder is preferably equal to or smaller than 15.5 nm, more preferably equal to or smaller than 15.0 nm, even more preferably equal to or smaller than 14.0 nm, still preferably equal to or smaller than 13.0 nm, and still more preferably equal to or smaller than 12.0 nm. The average particle size of the ε-iron oxide powder can be adjusted depending on the producing conditions of the ε-iron oxide powder or the like.

In the invention and the specification, average particle sizes of various powder such as the ε-iron oxide powder and the like are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder.

As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an aspect in which particles configuring the aggregate directly come into contact with each other, but also includes an aspect in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

Producing Method of ε-Iron Oxide Powder

As a producing method of the ε-iron oxide powder, a producing method from a goethite, a reverse micelle method, and the like are known. All of the producing methods are well known. In addition, for the method of producing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. S280-5284, J. Mater. Chem. C, 2013, 1, pp. 5200-5206 can be referred to, for example.

As an example, the ε-iron oxide powder can be obtained by a producing method of obtaining an ε-iron oxide powder, for example, through preparing a precursor of an ε-iron oxide (hereinafter, also referred to as a "precursor preparation step"), performing a coating formation process with respect to the precursor (hereinafter, also referred to as a "coating forming step"), converting the precursor into ε-iron oxide by performing heat treatment with respect to the precursor after the coating forming process (hereinafter, also referred to as a "heat treatment step"), performing coating removing process with respect to the ε-iron oxide (hereinafter, also referred to as a "coating removing step"), and adhering the compound of the M atom (hereinafter, also referred to as an "M atom adhering step"). Hereinafter, such a producing method will be further described. Here, the producing method described hereinafter is merely an example, and the ε-iron oxide powder according to one aspect of the invention is not limited to an ε-iron oxide powder produced by the producing method shown below.

Precursor Preparation Step

The precursor of the ε-iron oxide is a material which includes an ε-iron oxide type crystal structure as a main phase by being heated. The precursor can be hydroxide or oxyhydroxide (oxide hydroxide) containing an atom in which iron and a part of iron in the crystal structure can be substituted. The precursor preparation step can be performed by using a coprecipitation method or a reverse micelle method. Such a preparing method of the precursor is well known and the precursor preparation step of the preparing method can be performed by a well-known method. For example, regarding the preparation method of the precursor, well-known technologies disclosed in paragraphs 0017 to 0021 and examples of JP2008-174405A, paragraphs 0025 to 0046 and examples of WO2016/047559A1, and paragraphs 0038 to 0040, 0042, 0044 to 0045, and examples of WO2008/149785A1.

The ε-iron oxide not containing a substitutional atom substituted with a part of an iron atom can be represented by a compositional formula: $Fe_2O_3$. Meanwhile, the ε-iron oxide in which a part of iron atom is substituted with, for example, one to three kinds of the atom, can be represented by a compositional formula: $A^1_x A^2_y A^3_z Fe_{(2-x-y-z)} O_3$. $A^1$, $A^2$, and $A^3$ each independently represent a substitutional atom substituted with an iron atom, x, y, and z is each independently equal to or greater than 0 and smaller than 1, here, at least one thereof is greater than 0, and x+y+z is smaller than 2. The ε-iron oxide powder may or may not contain a substitutional atom substituted with an iron atom. Magnetic properties of the ε-iron oxide powder can be adjusted depending on the type and the substitution amount of the substitutional atom. In a case where the substitutional atom is contained, as the substitutional atom, one or more kinds of Ga, Co, Ti, Al, and Rh can be used, and one or more kinds of Ga, Co, and Ti are preferable. In a case of producing the ε-iron oxide powder containing a substitutional atom substituted with an iron atom, a part of a compound which is a supply source of Fe of the ε-iron oxide may be substituted with a compound of the substitutional atom. A composition of the obtained ε-iron oxide powder can be controlled in accordance with the substitution amount thereof. Examples of the compound which is a supply source of an iron atom and various substitutional atoms include an inorganic salt (may be hydrate) such as nitrate, sulfate, or chloride, an organic salt (may be hydrate) such as pentakis (hydrogen oxalate) salt, hydroxide, and oxyhydroxide.

Coating Forming Step

In a case of heating the precursor after the coating forming process, the reaction of converting the precursor into ε-iron oxide can proceed under the coating. In addition, the coating may be considered to play a role of preventing occurrence of sintering during the heating. From a viewpoint of ease of coating forming, the coating forming process is preferably performed in a solution and more preferably performed by adding a coating formation agent (compound for coating forming) to a solution containing the precursor. For example, in a case of performing the coating forming process in the same solution after the preparation of the precursor, the coating can be formed on the precursor by adding and stirring the coating formation agent to the solution after the preparation of the precursor. As a coating preferable from a viewpoint of ease of forming the coating on the precursor in the solution, a silicon-containing coating can be used. As the coating formation agent for forming the silicon-containing coating, for example, a silane compound such as alkoxysilane can be used. The silicon-containing coating can be formed on the precursor by hydrolysis the silane compound preferably using a sol-gel method. Specific examples of the silane compound include tetraethyl orthosilicate (TEOS), tetramethoxysilane, and various silane coupling agents. For the coating forming process, for example, well-known technologies disclosed in paragraph 0022 and examples of JP2008-174405A, paragraphs 0047 to 0049 and examples of WO2016/047559A1, paragraphs 0041 and 0043 and examples of WO2008/149785A1. For example, the coating forming process can be performed by stirring a solution including the precursor and the coating formation agent at a liquid temperature of 50° C. to 90° C. for approximately 5 to 36 hours. The coating may be coated over the entire surface of the precursor or a part of the surface of the precursor which is not coated with the coating may be included.

Heat Treatment Step

By performing the heat treatment with respect to the precursor after the coating forming process, the precursor can be converted into ε-iron oxide. The heat treatment can be performed with respect to a powder collected form a solution subjected to the coating forming process (powder of the precursor including the coating). For the heat treatment step, for example, well-known technologies disclosed in a paragraph 0023 and examples of JP2008-174405A, a paragraph 0050 and examples of WO2016/047559A1, and paragraphs 0041 and 0043 and examples of WO2008/149785A1. The heat treatment step can be performed, for example, in a heat treatment furnace at a furnace inner temperature of 900° C. to 1,200° C. for approximately 3 to 6 hours.

Coating Removing Step

By performing the heat treatment step, the precursor including the coating is converted into ε-iron oxide. The coating remains on the ε-iron oxide obtained as described above, and accordingly, the coating removing process is preferably performed. For the coating removing process, for example, well-known technologies disclosed in a paragraph 0025 and examples of JP2008-174405 and a paragraph 0053 and examples of WO2008/149785A1. The coating removing process can be, for example, performed by stirring the ε-iron oxide including the coating in a sodium hydroxide aqueous solution having a concentration of approximately 4 mol/L at a liquid temperature of approximately 60° C. to 90° C. for 5 to 36 hours. Here, the ε-iron oxide powder according to one aspect of the invention may be produced through the coating removing process, that is, may include the coating. In addition, the coating may not be completely removed in the coating removing process and a part of coating may remain.

M Atom Adhering Step

The ε-iron oxide powder having the uneven distribution of an M atom in a surface layer portion can be, for example, obtained by adhering a compound of the M atom on the particles configuring the powder of ε-iron oxide prepared by the method described above. As the compound of the M atom, hydroxide of the M atom can be used. Here, the hydroxide is used as a meaning including hydrous oxide which is partially dehydrated. The adhering treatment can be performed by a wet method or a dry method and is preferably performed in a wet method from a viewpoint of ease of the adhering treatment.

The adhering treatment can be performed, for example, by performing the following process of a powder of the ε-iron oxide prepared by the method described above.

By adding an ionic substance including the M atom into a basic aqueous solution while stirring and dispersing a powder of ε-iron oxide in the basic aqueous solution, the compound (for example, hydroxide) of the M atom can be adhered on the surface of the particles configuring the powder of ε-iron oxide. Accordingly, the uneven distribution of an M atom in a surface layer portion can be derived to the ε-iron oxide powder. The basic aqueous solution can be prepared by using sodium hydroxide, potassium hydroxide, tetramethyl ammonium hydroxide, or ammonia. The amount of base used in the preparation of the base aqueous solution is preferably adjusted so as to prepare an aqueous solution having pH in a range of 9 to 12. The ionic substance including the M atom added to the base aqueous solution can be, for example, sulfate, hydrochloride, nitrate, oxide, chloride of the M atom, or aqueous organic complex salt (acetate, oxalate, or citrate). The additive amount of such an ionic substance may be set so that the content of M atom in the ε-iron oxide powder after the adhering treatment is in the range described above. For the adhering treatment, a description disclosed in paragraphs 0041 and 0042 of JP2017-122044A can be referred to.

A well-known step can also be randomly performed before and/or after various steps described above. As such a step, various well-known steps such as filtering, washing, and drying can be used, for example.

The ε-iron oxide powder can be used as a ferromagnetic powder for magnetic recording. Specifically, the ε-iron oxide powder can be used as a ferromagnetic powder included in the magnetic layer in the magnetic recording medium including the non-magnetic support and the magnetic layer.

Magnetic Recording Medium

One aspect of the invention relates to a magnetic recording medium including a non-magnetic support, and a magnetic layer including a ferromagnetic powder, in which the ferromagnetic powder is the ε-iron oxide powder according to the aspect of the invention described above.

Hereinafter, the magnetic recording medium will be described in more detail.

Magnetic Layer

Ferromagnetic Powder

The magnetic layer of the magnetic recording medium includes the ε-iron oxide powder according to one aspect of the invention described above. Details thereof are as described above. A content (filling percentage) of the ferromagnetic powder in the magnetic layer is preferably 50% to 90% by mass and more preferably 60% to 90% by mass. A high filling percentage of the ferromagnetic powder in the magnetic layer is preferable from a viewpoint of improvement of recording density.

Binding Agent and Curing Agent

The magnetic recording medium can be a coating type magnetic recording medium and include a binding agent in the magnetic layer. The binding agent is one or more kinds of resin. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-024113A can be referred to. A content of the binding agent in the magnetic layer can be, for example, 1.0 to 30.0 parts by mass with respect to 100.0 parts by mass of the ferromagnetic powder. An average molecular weight of the resin used as the binding agent can be, for example, 10,000 to 200,000 as a weight-average molecular weight.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in a magnetic layer forming step. The same also applies to a layer formed using this composition, in a case where a composition used for forming other layers include the curing agent. The preferred curing agent is a thermosetting compound, polyisocyanate is suitable. For details of the polyisocyanate, descriptions disclosed in paragraphs 0124 and 0125 of JP2011-216149A can be referred to, for example. A content of the curing agent in the magnetic layer forming composition can be, for example, 0 to 80.0 parts by mass and is preferably 50.0 to 80.0 parts by mass with respect to 100.0 parts by mass of the binding agent.

Additives

The magnetic layer may include one or more kinds of additives, if necessary. As an example of the additive, the curing agent is used. Examples of the additive included in the magnetic layer include a non-magnetic powder (for example, an inorganic powder or carbon black), a lubricant, a dispersing agent, a dispersing assistant, an antibacterial agent, an antistatic agent, and an antioxidant. For example, for the lubricant, a description disclosed in paragraphs 0030 to 0033, 0035, and 0036 of JP2016-126817A can be referred to. The lubricant may be included in the non-magnetic layer which will be described later. For the lubricant which can be included in the non-magnetic layer, a description disclosed in paragraphs 0030, 0031, 0034 to 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to. In addition, as the non-magnetic powder which may be included in the magnetic layer, non-magnetic powder which can function as an abrasive, non-magnetic powder (for example, non-magnetic colloidal particles) which can function as a projection formation agent which forms projections suitably protruded from the surface of the magnetic layer, and the like can be used. As the additives, a commercially available product can be suitably selected according to the desired properties or manufactured by a well-known method, and can be used with any amount.

As the additive included in the magnetic layer, a nitrogen-containing polymer can be used. As an example of the nitrogen-containing polymer, a polyalkyleneimine chain-containing polymer can be used. A "polyalkyleneimine chain" means a polymer chain including two or more alkyleneimine chains which are same as or different from each other. Specific examples of the alkyleneimine chain include an alkyleneimine chain represented by Formula 3 and an alkyleneimine chain represented by Formula 4.

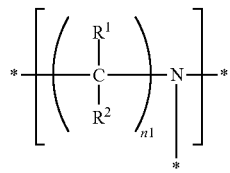

Formula 3

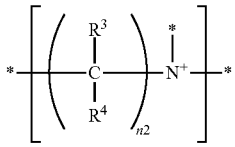

Formula 4

In Formula 3, $R^1$ and $R^2$ each independently represent a hydrogen atom or an alkyl group and n1 represents an integer equal to or greater than 2. In Formula 4, $R^3$ and $R^4$ each independently represent a hydrogen atom or an alkyl group and n2 represents an integer equal to or greater than 2.

In the invention and the specification, "*" in the formula representing a part of the compound represents a binding site of the partial structure and an adjacent atom. The bonding of one of two binding sites regarding nitrogen cation ($N^+$) in Formula 4 is normally ion bond of an anion and a nitrogen cation (formation of a salt crosslinking group). The binding at the other binding site represented by "*" is normally a covalent bond.

In the invention and the specification, the disclosed group may have a substituent or may not have a substituent, unless otherwise noted. In addition, the "number of carbon atoms" regarding the group having a substituent means the number of carbon atoms not including the number of carbon atoms of the substituent, unless otherwise noted. In the invention and the specification, the examples of the substituent include an alkyl group (for example, an alkyl group having 1 to 6 carbon atoms), a hydroxy group, an alkoxy group (for example, an alkoxy group having 1 to 6 carbon atoms), an halogen atom (for example, a fluorine atom, a chlorine atom, a bromine atom, and the like), a cyano group, an amino group, a nitro group, an acyl group, a carboxy group, salt of a carboxy group, a sulfonic acid group, and salt of a sulfonic acid group.

$R^1$ and $R^2$ in the alkyleneimine chain represented by Formula 3 and $R^3$ and $R^4$ in the alkyleneimine chain represented by Formula 4 each independently represent a hydrogen atom or an alkyl group. The alkyl group can be an alkyl group having 1 to 6 carbon atoms, is preferably an alkyl group having 1 to 3 carbon atoms, more preferably a methyl group or an ethyl group, and even more preferably a methyl group. The alkyl group is preferably a non-substitutional alkyl group. Examples of a combination of $R^1$ and $R^2$ in Formula 3 include an aspect in which one is a hydrogen atom and the other one is an alkyl group, an aspect in which both are hydrogen atoms, an aspect in which both are alkyl groups (alkyl groups which are same or different from each other), and preferably an aspect in which both are hydrogen atoms. The same applies to $R^3$ and $R^4$ in Formula 4.

A structure having the smallest number of carbon atoms configuring a ring as alkyleneimine is ethylene imine, and the number of carbon atoms of a main chain of the alkyleneimine chain (ethylene imine chain) obtained by ring opening of ethylene imine. Accordingly, the lower limit of n1 in Formula 3 and n2 in Formula 4 is 2. That is, n1 in Formula 3 and n2 in Formula 4 each independently represent an integer equal to or greater than 2. From a viewpoint of further improving durability of the magnetic recording medium, n1 in Formula 3 and n2 in Formula 4 are each independently preferably equal to or smaller than 10, more preferably equal to or smaller than 6, even more preferably equal to or smaller than 4, still preferably 2 or 3, still more preferably 2.

As an example of the polyalkyleneimine chain-containing polymer, a polymer having one or more partial structures selected from the group consisting of a partial structure represented by Formula 1 and a partial structure represented by Formula 2 can be used together with the polyalkyleneimine chain.

One aspect of the polyalkyleneimine chain-containing polymer is a polymer including one or more of only partial structures represented by Formula 1 in a molecule as such a partial structure, and another aspect is a polymer including one or more of only partial structures represented by Formula 2 in a molecule, and still another aspect is a polymer including one or more partial structures represented by Formula 1 in a molecule and one or more partial structures represented by Formula 2 in a molecule. In the polyalkyleneimine chain-containing polymer, the number of one or more partial structures selected from the group consisting of the partial structure represented by Formula 1 and the partial structure represented by Formula 2 is 1 or more, preferably 1 to 10, and more preferably 1 to 8 per molecule. In a case where the number of partial structures is 2 or more per molecule, all structures of the partial structures included may be the same the same as each other or different from each other.

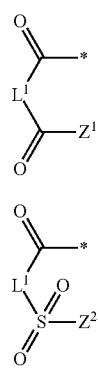

Formula 1

Formula 2

$L^1$ in Formula 1 and $L^2$ in Formula 2 each independently represent a divalent linking group.

As the divalent linking group, a divalent linking group configured with one selected from or a combination of two or more groups selected from the group consisting of an alkylene group which may have a linear, branched, or a cyclic structure, an alkenylene group which may have a linear, branched, or a cyclic structure, an aromatic group, —C(=O)—, and —O—. The aromatic group may or may not include a hetero atom and it is preferable that the aromatic group does not include a hetero atom (that is, arylene group). Examples of preferable divalent linking group include an alkylene group having 1 to 10 carbon atoms, an alkenylene group having 2 to 10 carbon atoms, and an aromatic group having 6 to 12 carbon atoms. Examples of more preferable divalent linking group include an alkylene group having 1 to 10 carbon atoms and an aromatic group having 6 to 12 carbon atoms. Examples of even more preferable divalent linking group include a linear alkylene group having 1 to 5 carbon atoms, a cycloalkylene group having 6 to 10 carbon atoms, and an arylene group having 6 to 12 carbon atoms.

$Z^1$ in Formula 1 and $Z^2$ in Formula 2 each independently represent a monovalent group represented by —OM or a monovalent group represented by —O$^-$A$^+$.

In —OM, M represents a hydrogen atom or an alkali metal atom. The alkali metal atom is, for example, a sodium atom and a potassium atom. The monovalent group represented by —OM is preferably —OH (that is, hydroxy group), —ONa or —OK, and more preferably —OH or —ONa.

In —O$^-$A$^+$, A$^+$ represents an ammonium cation. In —O$^-$A$^+$, oxygen anion and the ammonium cation represented by A$^+$ are bonded by ion bond to form salt. The ammonium cation can be represented by $N^+(R^{11})_4$. In $N^+(R^{11})_4$, four $R^{11}$'s each independently represent a hydrogen atom or a hydrocarbon group. In a case where the ammonium cation is an organic ammonium cation, at least one of four $R^{11}$'s represents a hydrocarbon group. The hydrocarbon group is preferably an alkyl group. The alkyl group may be any alkyl group of linear, branched, and cyclic alkyl group, and is preferably a linear alkyl group. The number of carbon atoms of the alkyl group is, for example, 1 to 10 and preferably 1 to 6. The four $R^{11}$'s may be same as each other or some or all of $R^{11}$'s may be different from each other. In $N^+(R^{11})_4$, all of the four $R^{11}$'s may be hydrogen atoms or all thereof may be hydrocarbon groups. In $N^+(R^{11})_4$, one to three $R^{11}$'s are hydrocarbon groups and $R^{11}$'s other than the hydrocarbon group is preferably a hydrogen atom.

The polyalkyleneimine chain-containing polymer includes a polyalkyleneimine chain and may or may not include other polymer chains. In one aspect, the polyalkyleneimine chain-containing polymer can include the partial structure, a polyalkyleneimine chain, and polymer chains other than the polyalkyleneimine chain. As one aspect of the other polymer chains, a vinyl polymer chain can be used. In addition, as another aspect of the other polymer chain, a polyester chain can be used.

The vinyl polymer chain is a vinyl polymer chain represented by Formula 5.

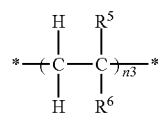

Formula 5

In Formula 5, $R^5$ represents a hydrogen atom or a substituent, $R^6$ represents a substituent, and n3 represents an integer equal to or greater than 2. Specific description regarding Formula 5 is below.

In Formula 5, $R^5$ represents a hydrogen atom or a substituent, and, for example, represents a hydrogen atom or a methyl group. $R^6$ represents a substituent. Examples of the substituent represented by $R^6$ include an alkyloxycarbonyl group, hydroxyalkyloxycarbonyl group, and aryl group, and specific examples thereof include substituents including specific examples of vinyl polymer which will be described later. The alkyl group including an alkyloxycarbonyl group and the alkyl group substituted with a hydroxy group included in a hydroxyalkyloxycarbonyl group can be a linear alkyl group, a branched alkyl group, or a cyclic alkyl group.

The number of carbon atoms of the linear alkyl group and the branched alkyl group can be, for example, 1 to 20. The number of carbon atoms of the cyclic alkyl group can be, for example, 3 to 20. The cyclic alkyl group includes a monocyclic alkyl group and a polycyclic alkyl group (for example, a bicycloalkyl group). An aryl group can be an aryl group having 6 to 20 carbon atoms, and specific examples thereof include a phenyl group.

In a case where the polyalkyleneimine chain-containing polymer is a vinyl polymer chain, the structure of the vinyl polymer chain is derived from a structure of a vinyl monomer used for synthesis of the polymer. The vinyl monomer is a compound including a vinyl group and/or a vinylidene group. Examples of the vinyl monomer include (meth) acrylic acid esters, crotonic acid esters, vinyl esters, maleic acid diesters, fumaric acid diesters, itaconic acid diesters, (meth)acrylamides, styrenes, vinyl ethers, vinyl ketones, olefins, maleimides, and (meth)acrylonitrile. The above expression of plurality is used as a meaning including a derivative thereof. For example, styrenes are used as a meaning including styrene and a styrene derivative. In addition, in the invention and the specification, "(meth) acryl" is used as a meaning including acryl and methacryl. For example, by using (meth)acrylic acid ester as the vinyl monomer, a compound including a poly(meth)acrylate chain as the vinyl polymer chain can be obtained. In addition, for example, by using styrene as the vinyl monomer, a polymer including a polystyrene chain as the vinyl polymer chain can be obtained.

In the vinyl monomer, from a viewpoint of improving durability of the magnetic recording medium, the preferable vinyl monomer is (meth)acrylic acid esters and styrenes, and more preferable vinyl monomer is (meth)acrylic acid esters. Specific examples of (meth)acrylic acid esters include methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, lauryl (meth)acrylate, amyl (meth)acrylate, n-hexyl (meth) acrylate, cyclohexyl (meth)acrylate, t-butylcyclohexyl (meth)acrylate, 2-ethylhexyl (meth)acrylate, t-octyl (meth) acrylate, dodecyl (meth)acrylate, octadecyl (meth)acrylate, acetoxyethyl (meth)acrylate, phenyl (meth)acrylate, 2-hydroxyethyl (meth)acrylate, 2-hydroxypropyl (meth)acrylate, 3-hydroxypropyl (meth)acrylate, 4-hydroxybutyl (meth) acrylate, 2-methoxyethyl (meth)acrylate, 2-ethoxyethyl (meth)acrylate, 2-(2-methoxyethoxy) ethyl (meth)acrylate, 3-phenoxy-2-hydroxypropyl (meth)acrylate, 2-chloroethyl (meth)acrylate, glycidyl (meth)acrylate, 3,4-epoxycyclohexylmethyl (meth)acrylate, vinyl (meth)acrylate, 2-phenylvinyl (meth)acrylate, 1-propenyl (meth)acrylate, allyl (meth)acrylate, 2-allyloxyethyl (meth)acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, propylene glycol monomethyl ether (meth) acrylate, polyethylene glycol monomethyl ether (meth)acrylate, polyethylene glycol monoethyl ether (meth)acrylate, β-phenoxyethoxyethyl (meth)acrylate, nonylphenoxy polyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate, γ-butyrolactone (meth)acrylate, isobornyl (meth)acrylate, furfuryl (meth)acrylate, and tetrahydrofurfuryl (meth)acrylate.

Regarding the vinyl polymer chain, n3 in Formula 5 is an integer equal to or greater than 2, and is preferably an integer equal to or greater than 5, and more preferably an integer equal to or greater than 7, from a viewpoint of improving durability of the magnetic recording medium. In addition, n3 can be, for example, an integer equal to or smaller than 100, and is preferably an integer equal to or smaller than 80 and more preferably an integer equal to or smaller than 70, from a viewpoint of improving dispersibility of the ferromagnetic powder. In Formula 5, n3 is an integer equal to or greater than 2, and thus, a plurality of $R^5$'s are included in Formula 5. A plurality of $R^5$'s may be the same as or different from each other. The same applies to $R^6$.

Hereinafter, specific examples of the vinyl polymer chain are shown. However, in a case where the polyalkyleneimine chain-containing polymer includes the vinyl polymer chain, the included vinyl polymer chain is not limited to the following specific examples. In a case where the polyalkyleneimine chain-containing polymer includes the vinyl polymer chain, only one kind of vinyl polymer chain may be included or two or more kinds of vinyl polymer chains having different structures may be included. The following n3 is the same as n3 in Formula 5 described above.

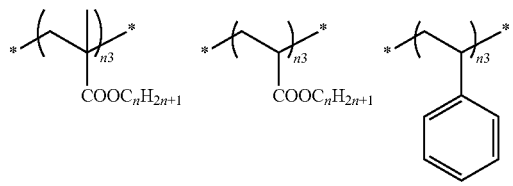

(n represents, for example, an integer of to 20)

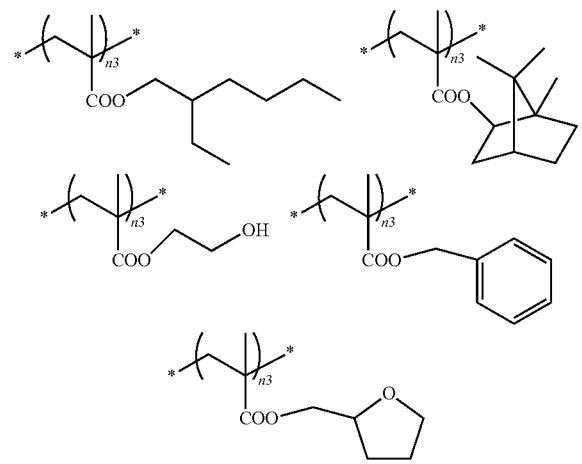

In one aspect, the polyester chain is bonded to a nitrogen atom N included in the alkyleneimine chain represented by Formula 3 at * in Formula 3 by a carbonyl bond —(C=O)—, and —N—(C=O)— can be formed. In another aspect, alkyleneimine chain represented by Formula 4 and polyester chain can form a salt crosslinking group by a nitrogen cation $N^+$ in Formula 4 and an anionic group included in the polyester chain. As the salt crosslinking group, a group formed by an oxygen anion $O^-$ included in the polyester chain and $N^+$ in Formula 4 can be used.

As the polyester chain which is bonded to the nitrogen atom N included in the alkyleneimine chain represented by Formula 3 by a carbonyl bond —(C=O)—, a polyester chain represented by Formula 6 can be used. The polyester chain represented by Formula 6 can be bonded to the alkyleneimine chain represented by Formula 3 by forming —N—(C=O)— by the nitrogen atom included in the alkyleneimine chain and the carbonyl group —(C=O)— included in the polyester chain at the binding site represented by *.

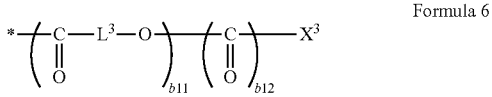

Formula 6

As the polyester chain to be bonded to the alkyleneimine chain represented by Formula 4 by forming a salt crosslinking group by $N^+$ in Formula 4 and an anionic group included in the polyester chain, a polyester chain represented by Formula 7 can be used. The polyester chain represented by Formula 7 can form a salt crosslinking group with $N^+$ in Formula 4 and an oxygen anion $O^-$.

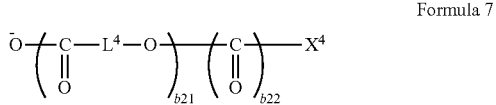

Formula 7

$L^3$ in Formula 6 and $L^4$ in Formula 7 each independently represent a divalent linking group. Examples of preferable divalent linking group include an alkylene group having 3 to 30 carbon atoms. In a case where the alkylene group includes a substituent, the number of carbon atoms of the alkylene group is the number of carbon atoms not including the number of carbon atoms of the substituent, as described above.

b11 in Formula 6 and b21 in Formula 7 each independently represent an integer equal to or greater than 2 and, is for example, an integer equal to or smaller than 200.

b12 in Formula 6 and b22 in Formula 7 each independently represent 0 or 1.

$X^3$ in Formula 6 and $X^4$ in Formula 7 each independently represent a hydrogen atom or a monovalent substituent. Examples of the monovalent substituent include monovalent substituents selected from the group consisting of an alkyl group, a haloalkyl group (for example, a fluoroalkyl group), an alkoxy group, a polyalkyleneoxyalkyl group, and an aryl group.

The alkyl group may include a substituent or may be unsubstituted. As an alkyl group including a substituent, an alkyl group substituted with a hydroxy group (hydroxyalkyl group) and an alkyl group having one or more substituted halogen atoms are preferable. In addition, an alkyl group in which all of hydrogen atoms bonded to carbon atoms are substituted with halogen atoms (haloalkyl group) is also preferable. As the halogen atom, a fluorine atom, a chlorine atom, a bromine atom, and the like can be used. As the alkyl group, an alkyl group having more preferably 1 to 30 carbon atoms, even more preferably 1 to 10 carbon atoms is used. The alkyl group may be linear, branched, or cyclic group. The same applies to the haloalkyl group.

Specific examples of substituted or unsubstituted alkyl group or haloalkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a pentadecyl group, a hexadecyl group, a heptadecyl group, an octadecyl group, an eicosyl group, an isopropyl group, an isobutyl group, an isopentyl group, a 2-ethylhexyl group, a tert-octyl group, a 2-hexyldecyl group, a cyclohexyl group, a cyclopentyl group, a cyclohexylmethyl group, an octylcyclohexyl group, a 2-norbornyl group, a 2,2,4-trimethylpentyl group, an acetylmethyl group, an acetylethyl group, a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, a hydroxynonyl group, a hydroxydecyl group, a chloromethyl group, a dichloromethyl group, a trichloromethyl group, a bromomethyl group, a 1,1,1,3,3,3-hexafluoroisopropyl group, a heptafluoropropyl group, a pentadecafluoroheptyl group, a nonadecafluorononyl group, a hydroxyundecyl group, a hydroxydodecyl group, a hydroxypentadecyl group, a hydroxy heptadecyl group, and a hydroxy octadecyl group.

Examples of the alkoxy group include a methoxy group, an ethoxy group, a propyloxy group, a hexyloxy group, a methoxyethoxy group, a methoxyethoxy ethoxy group, and a methoxyethoxy ethoxymethyl group.

The polyalkyleneoxyalkyl group is a monovalent substituent represented by $R^{10}(OR^{11})n3(O)m1$-. $R^{10}$ represents an alkyl group, $R^{11}$ represents an alkylene group, n3 represents an integer equal to or greater than 2, and m1 represents 0 or 1.

The alkyl group represented by $R^{10}$ is the same as the alkyl group represented by $X^3$ or $X^4$. For the detail of the alkylene group represented by $R^{11}$, the description regarding the alkyl group represented by $X^3$ or $X^4$ can be applied, by replacing with an alkylene group obtained by removing one hydrogen atom from these alkylene groups (for example, methyl group or methylene group). n3 is an integer equal to or greater than 2, for example, equal to or smaller than 10, and preferably an integer equal to or smaller than 5.

The aryl group may include a substituent or form a condensed ring, and is more preferably an aryl group having 6 to 24 carbon atoms, and examples thereof include a phenyl group, a 4-methylphenyl group, a 4-phenylbenzoic acid, a 3-cyanophenyl group, a 2-chlorophenyl group, and a 2-naphthyl group.

The polyester chain represented by Formula 6 and the polyester chain represented by Formula 7 described above can have a polyester-derived structure obtained by a well-known polyester synthesis method. As the polyester synthesis method, lactone ring-opening polymerization disclosed in paragraphs 0056 and 0057 of JP2015-028830A can be used. However, the polyester chain is not limited to have the polyester-derived structure obtained by the lactone ring-opening polymerization, and can have a polyester-derived structure obtained by well-known polyester synthesis methods, for example, polycondensation of polyvalent carboxylic acid and polyhydric alcohol and polycondensation of hydroxycarboxylic acid.

A weight-average molecular weight of the polyalkyleneimine chain-containing polymer can be, for example, equal to or smaller than 80,000, is preferably equal to or smaller than 60,000, more preferably equal to or smaller than 35,000, even more preferably equal to or smaller than 34,000, further more preferably equal to or smaller than 30,000, still preferably equal to or smaller than 25,000, still more preferably equal to or smaller than 18,000, still even more preferably equal to or smaller than 15,000, still further more preferably equal to or smaller than 12,000, and still even further more preferably equal to or smaller than 10,000. From a viewpoint of improving durability of the magnetic recording medium, the weight-average molecular weight is preferably smaller than a weight-average molecular weight of a binding agent used in combination in the magnetic layer. In addition, from a viewpoint of improving durability of the magnetic recording medium, the weight-average molecular weight of the polyalkyleneimine chain-containing polymer is preferably equal to or greater than 1,000, more preferably equal to or greater than 1,500, even more preferably equal to or greater than 2,000, and still preferably equal to or greater than 3,000.

In the invention and the specification, the average molecular weight (weight-average molecular weight and number average molecular weight which will be described later) is a value obtained by performing standard polystyrene conversion of a value measured by gel permeation chromatography (GPC). Unless otherwise noted, the average molecular weight shown in the examples which will be described later is a value (polystyrene-converted value) obtained by performing standard polystyrene conversion of a value measured using the GPC under the following measurement conditions.

GPC device: HLC-8220 (manufactured by Tosoh Corporation)

Guard Column: TSK guard column Super HZM-H

Column: TSK gel Super HZ 2000, TSK gel Super HZ 4000, TSK gel Super HZ-M (manufactured by Tosoh Corporation, 4.6 mm (inner diameter)×15.0 cm, three kinds of columns are linked in series)

Eluent: Tetrahydrofuran (THF), including stabilizer (2,6-di-t-butyl-4-methylphenol)

Eluent flow rate: 0.35 mL/min

Column temperature: 40° C.

Inlet temperature: 40° C.

Refractive index (RI) measurement temperature: 40° C.

Sample concentration: 0.3 mass %

Sample injection amount: 10 μL

From a viewpoint of improving durability of the magnetic recording medium, an amine value of the polyalkyleneimine chain-containing polymer is preferably equal to or greater than 0.10 mmol/g, more preferably equal to or greater than 0.15 mmol/g, even more preferably equal to or greater than 0.20 mmol/g, still preferably equal to or greater than 0.25 mmol/g. The amine value of the polyalkyleneimine chain-containing polymer can be, for example, controlled depending on a percentage of the polyalkyleneimine chain occupying the structure of the polymer. As the percentage of the polyalkyleneimine chain is high, the amine value of the polymer tends to increase. In addition, the amine value of the polyalkyleneimine chain-containing polymer can be, for example, equal to or smaller than 1.50 mmol/g, equal to or smaller than 1.40 mmol/g, equal to or smaller than 1.20 mmol/g, equal to or smaller than 1.00 mmol/g, equal to or smaller than 0.80 mmol/g, or equal to or smaller than 0.60 mmol/g.

In the invention and the specification, the amine value is a value measured by a potentiometric method (solvent: tetrahydrofuran/water=100/10 (volume ratio), titrant: 0.01 N (0.01 mol/L) hydrochloric acid) at room temperature, and is the value of mmol of hydrochloric acid necessary for neutralization of 1 g of the sample. In the invention and the specification, the "room temperature" is a temperature of 20° C. to 25° C.

From viewpoints of improving durability of the magnetic recording medium and improving dispersibility of the ferromagnetic powder, an acid value of the polyalkyleneimine chain-containing polymer is preferably equal to or greater than 0.20 mmol/g, more preferably equal to or greater than 0.30 mmol/g, even more preferably equal to or greater than 0.40 mmol/g, and still preferably equal to or greater than 0.50 mmol/g.

The acid value of the polyalkyleneimine chain-containing polymer can be controlled, for example, depending on a percentage of the partial structures selected from the group consisting of a partial structure represented by Formula 1 and a partial structure represented by Formula 2 occupying the structure of the polyalkyleneimine chain-containing polymer. As the partial structure is high, the acid value of the polymer tends to increase. In addition, the acid value of the polyalkyleneimine chain-containing polymer can be, for example, equal to or smaller than 3.00 mmol/g, equal to or smaller than 2.50 mmol/g, or equal to or smaller than 2.00 mmol/g.

In the invention and the specification, the acid value is a value measured by a potentiometric method (solvent:tetrahydrofuran/water=100/10 (volume ratio), titrant: 0.01 N (0.01 mol/L) potassium hydroxide) at room temperature, and is the value of mmol of potassium hydroxide necessary for neutralization of 1 g of the sample.

The polyalkyleneimine chain-containing polymer may be a compound including the polyalkyleneimine chain and the partial structure described above, and the synthesis method thereof is not particularly limited. The polyalkyleneimine chain-containing polymer can be a random copolymer and a block copolymer. For example, by reacting a polyalkyleneimine chain-containing polymer with acid anhydride, acid modification of the polyalkyleneimine chain-containing polymer can be performed to introduce the partial structure represented by Formula 1 and/or the partial structure represented by Formula 2. The acid anhydride, for example, can react with an unreacted amino group of a polyalkyleneimine chain of the polyalkyleneimine chain-containing polymer. Regarding the reaction conditions of the acid modification, a well-known technology can be used.

As the acid anhydride which can be used for acid modification, the following acid anhydride can be used, for example.

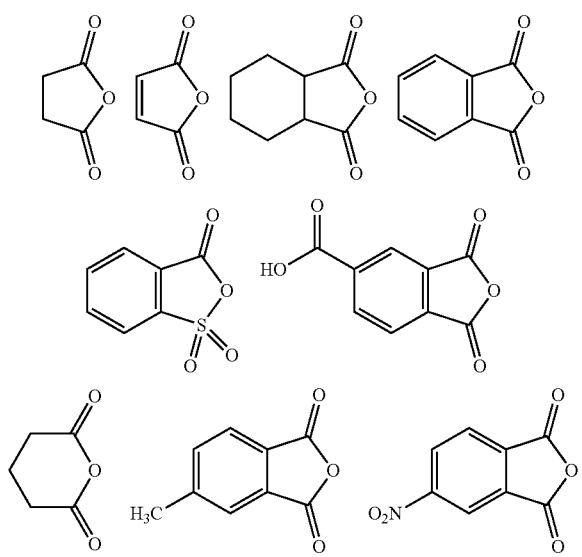

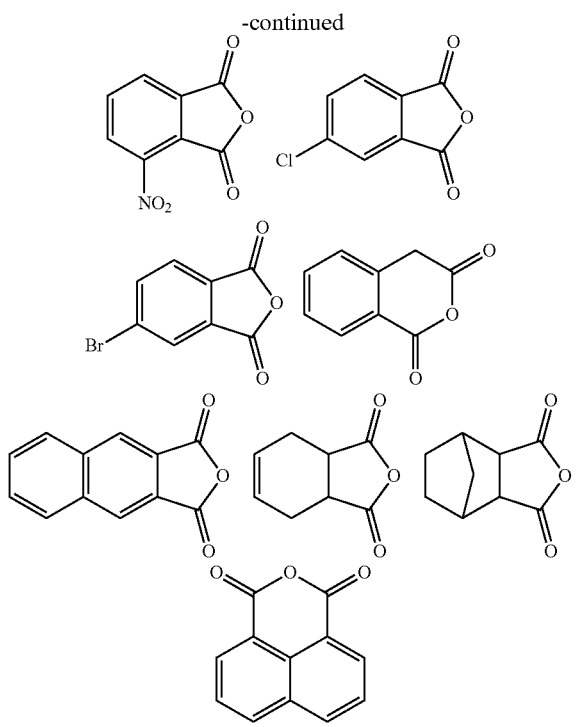

As one aspect of the polyalkyleneimine chain-containing polymer subjected to the acid modification, a polymer including a polyalkyleneimine chain and a vinyl polymer chain can be used. By causing a reaction between polyalkyleneimine and a vinyl polymer including a functional group capable of reacting with an amino group on one terminal (hereinafter, also referred to as an "intermediate"), it is possible to synthesis the polymer by forming a bond by the amino group included in polyalkyleneimine and the functional group. The bond can be covalent bond or ion bond (formation of salt crosslinking group), as described above. Examples of the functional group capable of reacting with the amino group included in the intermediate include a functional group capable of causing a condensation reaction between an amino group and acid, a functional group capable of causing an acid formation reaction between an amino group and acid, and a functional group causing an addition reaction of an amino group, and specific examples thereof include a carboxy group, an acrylate group, a methacrylate group, and an isocyanate group. The intermediate, for example, is possible to synthesize by reacting one or more kinds of vinyl monomer and the compound including a functional group capable of reacting with an amino group in a well-known reaction solvent. As the compound including a functional group capable of reacting with an amino group, a thiol compound including one functional group capable of reacting with an amino group and one thiol group in one molecule can be used. The thiol compound can function as a chain transfer agent. Examples of the thiol compound include mercaptopropionic acid, thioglycolic acid, thiomalic acid, thiolactic acid, 2-mercaptobenzoic acid, 3-mercaptobenzoic acid, and 4-mercaptobenzoic acid. In addition, the synthesis reaction of the intermediate can be performed using a well-known polymerization initiator. Regarding the reaction conditions, a well-known technology regarding the polymerization reaction of the vinyl polymer and a well-known technology regarding the reaction of the thiol compound can be used. The weight-average molecular weight of the intermediate can be, for example, 1,000 to 30,000 and is preferably 1,500 to 25,000.

The polyalkyleneimine is a polymer obtained by ring opening polymerization of alkyleneimine. The polyalkyleneimine can be synthesized by a well-known polymerization reaction and can also be purchased as a commercially available product. In the invention and the specification, the "polymer" is used as a meaning including a homopolymer and a copolymer. As the polyalkyleneimine, polyalkyleneimine having a number average molecular weight of 200 to 10,000 is suitable.

By reacting polyalkyleneimine and the intermediate, the polymer including the polyalkyleneimine chain and the vinyl polymer chain can be obtained by forming a bond by the amino group included in polyalkyleneimine and the functional group included in the intermediate. Regarding a mixing ratio of polyalkyleneimine and the intermediate in the reaction described above, a mol number of the functional group included in the intermediate with respect to 1 mol of the amino group included in polyalkyleneimine can be 0.20 to 1.20 mol and is preferably 0.40 to 1.10 mol. Regarding the reaction conditions of the reaction, a well-known technology can be used.

As one aspect of the polyalkyleneimine chain-containing polymer subjected to the acid modification, a polymer including a polyalkyleneimine chain and a polyester chain can also be used. For details of the synthesis method of such a polymer, a description disclosed in paragraphs 0026 to 0070 of JP2015-028830A can be referred to. In a case where the compound including the polyalkyleneimine chain and the partial structure described above includes a polyester chain, a number-average molecular weight of polyester used for synthesizing this compound is preferably equal to or greater than 200, more preferably equal to or greater than 400, and even more preferably equal to or greater than 500. In addition, the number-average molecular weight of polyester is preferably equal to or smaller than 100,000 and more preferably equal to or smaller than 50,000. The number-average molecular weight of polyester shown in examples which will be described later is a value (polystyrene conversion value) obtained by performing standard polystyrene conversion of a value measured by GPC under the following measurement conditions.

Measurement device: HLC-8220 GPC (manufactured by Tosoh Corporation)

Column: TSK gel Super HZ2000/TSK gel Super HZ 4000/TSK gel Super HZ-H (manufactured by Tosoh Corporation)

Eluent: Tetrahydrofuran (THF)

Flow rate: 0.35 mL/min

Column temperature: 40° C.

Detector: Refractive index (RI) detector

In addition, as the polyalkyleneimine chain-containing polymer included in the magnetic layer, a polyalkyleneimine chain-containing polymer disclosed in JP2015-028830A can also be used. For details of such a polymer, a description disclosed in paragraphs 0026 to 0070 of JP2015-028830A can be referred to.

0.5 parts by mass or more of the nitrogen-containing polymer such as the polyalkyleneimine chain-containing polymer is preferably included in the magnetic layer with respect to 100.0 parts by mass of the ferromagnetic powder, from a viewpoint of improving durability of the magnetic recording medium, and the content thereof is more preferably equal to or greater than 1.0 parts by mass, even more preferably equal to or greater than 3.0 parts by mass, still preferably equal to or greater than 5.0 parts by mass, still more preferably equal to or greater than 10.0 parts by mass, still even more preferably equal to or greater than 15.0 parts by mass, and still further more preferably equal to or greater than 20.0 parts by mass. Meanwhile, in order to improve a recording density, it is preferable to increase a filling percentage of the ferromagnetic powder in the magnetic layer. From this viewpoint, the content of the component other than the ferromagnetic powder is preferably relatively low. From this viewpoint, the content of the nitrogen-containing polymer such as the polyalkyleneimine chain-containing polymer in the magnetic layer is preferably equal to or smaller than 50.0 parts by mass, more preferably equal to or smaller than 40.0 parts by mass, and even more preferably equal to or smaller than 35.0 parts by mass, with respect to 100.0 parts by mass of the ferromagnetic powder.

As the additive included in the magnetic layer, a compound disclosed as a component (A) in JP2015-088213A can also be used. For details of such a compound, a description disclosed in paragraphs 0028 to 0059 of JP2015-088213A can be referred to.

Non-Magnetic Layer

In one aspect, the magnetic recording medium can include a magnetic layer directly on the non-magnetic support. In another aspect, the magnetic recording medium can also include a non-magnetic layer including non-magnetic powder between the non-magnetic support and the magnetic layer.

The non-magnetic powder used in the non-magnetic layer may be a powder of an inorganic substance (inorganic powder) or a powder of an organic substance (organic powder). In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, a description of paragraphs 0040 and 0041 of JP2010-024113A can be referred to. The content (filling percentage) of the non-magnetic powder of the non-magnetic layer is preferably 50% to 90% by mass and more preferably 60% to 90% by mass.

The non-magnetic layer can include a binding agent and can also include one or more additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The "non-magnetic layer" of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

1 [kOe]=$10^6/4\pi$ [A/m]

Non-Magnetic Support

As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium can also include or may not include a back coating layer including a non-magnetic powder on a surface of the non-magnetic support opposite to the surface provided with the magnetic layer. The back coating layer preferably includes any one or both of carbon black and inorganic powder. The back coating layer can include a binding agent or can also include one or more kinds of additives. In regards to the binding agent included in the back coating layer and various additives which can be randomly included therein, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Non-Magnetic Support and Thickness of Each Layer

A thickness of the non-magnetic support is preferably 3.0 to 20.0 µm, more preferably 3.0 to 10.0 µm, and even more preferably 3.0 to 6.0 µm.

A thickness of the magnetic layer can be optimized according to a saturation magnetization amount of a magnetic head used, a head gap length, a recording signal band, and the like. The thickness of the magnetic layer is preferably 10 nm to 150 nm, more preferably 20 nm to 120 nm, and even more preferably 30 nm to 100 nm, from a viewpoint of realizing high-density recording. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.05 to 1.5 µm and preferably 0.1 to 1.0 µm.

A thickness of the back coating layer is preferably equal to or smaller than 0.9 µm and even more preferably 0.1 to 0.7 µm.

The thicknesses of various layers and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a scanning electron microscope. In the cross section observation, various thicknesses can be obtained as the thickness obtained at one portion, or as an arithmetical mean of thicknesses obtained at a plurality of portions which are two or more portions randomly extracted, for example, two portions. Alternatively, the thickness of each layer may be obtained as a designed thickness calculated under the manufacturing conditions.

Manufacturing Method of Magnetic Recording Medium

A step of preparing compositions for forming the magnetic layer, and the non-magnetic layer and the back coating layer randomly provided, can generally include at least a kneading step, a dispersing step, and a mixing step provided before and after these steps, if necessary. Each step may be divided into two or more stages. The component used in the preparation of each layer forming composition may be added at an initial stage or in a middle stage of each step. In addition, each raw material may be separately added in two or more steps. In order to prepare each layer forming composition, a well-known manufacturing technology can be used. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. In addition, in order to disperse each layer forming composition, glass beads and one or more kinds of dispersion beads selected from the group consisting of other dispersion beads can be used as a dispersion medium. As such dispersion beads, zirconia beads, titania beads, and steel beads which are dispersion beads having high specific gravity are suitable. These dispersion beads can be used by optimizing a particle diameter (bead diameter) and a filling percentage. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

The magnetic layer can be formed through a step of directly applying the magnetic layer forming composition onto a surface of the non-magnetic support or performing multilayer coating with the non-magnetic layer forming composition in order or at the same time. The back coating layer can be formed through a step of applying the back coating layer forming composition on a surface of the non-magnetic support on a side opposite to the surface provided with (or to be provided with) the magnetic layer.

After the coating step, various processes such as a drying process, an alignment process of the magnetic layer, and a surface smoothing treatment (calendar process) can be performed. For the coating step and various processes, well-known technologies can be used, and for example, a description disclosed in paragraphs 0051 to 0057 of JP2010-024113A can be referred to, for example. For example, as the alignment process, a homeotropic alignment process can be performed. The homeotropic alignment process can be performed by a well-known method such as a method using a different polar facing magnet. In the alignment zone, a drying speed of the coating layer can be controlled by a temperature, an air flow of the dry air and/or a transporting rate of the magnetic tape in the alignment zone. In addition, the coating layer may be preliminarily dried before transporting to the alignment zone.

A servo pattern can be formed on the magnetic recording medium manufactured as described above by a well-known method, in order to realize tracking control of a magnetic head of the magnetic recording and reproducing device and control of a running speed of the magnetic recording medium. The "formation of the servo pattern" can be "recording of a servo signal". The magnetic recording medium may be a tape-shaped magnetic recording medium (magnetic tape) or a disk-shaped magnetic recording medium (magnetic disk). Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319, a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the positions of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 µm, 1 to 10 µm, or equal to or greater than 10 µm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is generally accommodated in a magnetic tape cartridge and the magnetic tape cartridge is mounted in a magnetic recording and reproducing device.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data to the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer of the magnetic tape, and accordingly, the recording and/or reproduction of the data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. For other details of the magnetic tape cartridge, a well-known technology can be used.

The magnetic recording medium according to one aspect of the invention described above can show excellent electromagnetic conversion characteristics, in the initial stage of running and after the repeated running in the high temperature and high humidity environment. As an example, the environment of high humidity can be, for example, an environment of relative humidity of 70 to 100%, and the high temperature can be, for example, approximately 25° C. to 50° C.

Magnetic Recording and Reproducing Device

One aspect of the invention relates to a magnetic recording and reproducing device including the magnetic recording medium and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which a surface of a magnetic layer and a magnetic head are in contact with each other and slide on each other, in a case of performing the recording of data on a magnetic recording medium and/or the reproducing of the recorded data.

The magnetic head included in the magnetic recording and reproducing device can be a recording head capable of performing the recording of data on the magnetic recording medium, and can also be a reproducing head capable of performing the reproducing of data recorded on the magnetic recording medium. In addition, in the aspect, the magnetic recording and reproducing device can include both of a recording head and a reproducing head as separate magnetic heads. In another aspect, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing device. The magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to the aspect of the invention, and well-known technologies can be applied for the other configurations.

For example, in a case of the recording of data on the magnetic recording medium on which the servo pattern is formed and/or the reproducing of the recorded data, first, the tracking is performed by using the servo signal obtained by the reading of the servo pattern. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can perform the recording and/or the reproducing with respect to other data bands. In this case, the servo signal reading element is moved to a predetermined servo band by using the UDIM information described above, and the tracking with respect to the servo band may be started.

Composition

In addition, one aspect of the invention relates to a composition including the ε-iron oxide powder.

Details of the ε-iron oxide powder included in the composition are as described above. The composition may further or may not include one or more kinds of component, in addition to the ε-iron oxide powder. As an example of such a component, one or more kinds of binding agent can be used. In addition, the composition may or may not include one or more kinds of solvent.

EXAMPLES

Hereinafter, the invention will be described with reference to examples. However, the invention is not limited to aspects shown in the examples. "Parts" and "%" in the following description are based on mass, unless otherwise noted. In addition, steps and evaluations described below are performed in an environment of an atmosphere temperature of 23° C.±1° C., unless otherwise noted. "eq" described below indicates equivalent and a unit not convertible into SI unit.

Example 1

Producing of ε-Iron Oxide Powder 3.6 g of ammonia aqueous solution having a concentration of 25% was added to a material obtained by dissolving 8.3 g of iron (III) nitrate nonahydrate, 1.01 g of gallium (III) nitrate octahydrate, 189 mg of cobalt (III) nitrate hexahydrate, 152 mg of titanium (III) sulfate, and 1.0 g of polyvinyl pyrrolidone (PVP) in 92.3 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 0.85 g of citric acid in 9.15 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the liquid temperature of 50° C., and 13.3 mL of tetraethoxysilane (TEOS) was added dropwise and stirred for 24 hours. 51 g of ammonium sulfate was added to the obtained reaction solution, the precipitated powder was collected by centrifugal separation, washed with pure water, and dried in a heating furnace at a furnace inner temperature of 80° C., and a precursor of ε-iron oxide was obtained.

The heating furnace at a furnace inner temperature of 1028° C. (firing temperature) was filled with the obtained powder of precursor in the atmosphere and subjected to heat treatment for 4 hours.

The heat-treated powder was put into sodium hydroxide (NaOH) aqueous solution having a concentration of 4 mol/L, the liquid temperature was held at 70° C., stirring was performed for 24 hours, and accordingly, a silicon acid compound was removed from the heat-treated powder. This powder was collected by a centrifugal separation process and washed with pure water, and a slurry was obtained.

A powder concentration of the slurry obtained was adjusted with pure ware to be 8%, 500 g of this slurry was stirred at a liquid temperature of 85° C. at rotation rate of 300 revolutions per minute (rpm), 6.3 g of an aluminum chloride aqueous solution having a concentration of 1.0% was added and stirred for 1 hour, a sodium hydroxide aqueous solution was added dropwise so that pH becomes 8.6, and stirring was continued for 1 hour to adhere a hydroxide of Al on the particles of the powder. This slurry was washed with water, the powder was collected by decantation, and the collected powder was dried.

Regarding the obtained powder, an X-ray diffraction analysis was performed. The X-ray diffraction analysis was performed by scanning CuKα ray under the condition of a voltage of 45 kV and intensity of 40 mA and measuring an X-ray diffraction pattern under the following conditions. It was confirmed that the produced ferromagnetic powder does not have a crystal structure of an α phase and a γ phase and has a crystal structure of a single phase which is an ε phase (ε-iron oxide type crystal structure) from the peak of the XRD pattern obtained by the X-ray diffraction analysis. That is, it was confirmed that the ε-iron oxide powder was produced.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees A part of the produced ε-iron oxide powder was used in the manufacturing of the magnetic recording medium and another part thereof was used in evaluation of the powder performed by methods which will be described later.

Regarding each ferromagnetic powder produced by the method which will be described later, the X-ray diffraction analysis was performed in the same manner as in Example 1, the produced ferromagnetic powder does not have a crystal structure of an α phase and a γ phase and has a crystal structure of a single phase which is an ε phase (ε-iron oxide type crystal structure). That is, ε-iron oxide powder was confirmed.

Manufacturing of Magnetic Recording Medium (Magnetic Tape)

(1) List of Magnetic layer forming composition
Magnetic liquid
Ferromagnetic powder (see Table 1): 100.0 parts
$SO_3Na$ group-containing polyurethane resin: 14.0 parts
(Weight-average molecular weight: 70,000, $SO_3Na$ group: 0.4 meq/g)
Cyclohexanone: 150.0 parts
Methyl ethyl ketone: 150.0 parts
Oleic acid: 2.0 parts
Abrasive solution
Abrasive solution A
Alumina abrasive (average particle size: 100 nm): 3.0 parts
$SO_3Na$ group-containing polyurethane resin: 0.3 parts
(Weight-average molecular weight: 70,000, $SO_3Na$ group: 0.3 meq/g)
Cyclohexanone: 26.7 parts
Abrasive solution B
Diamond abrasive (average particle size: 100 nm): 1.0 part
$SO_3Na$ group-containing polyurethane resin: 0.1 parts
(Weight-average molecular weight: 70,000, $SO_3Na$ group: 0.3 meq/g)
Cyclohexanone: 26.7 parts
Silica sol
Colloidal silica (average particle size: 100 nm): 0.2 parts
Methyl ethyl ketone: 1.4 parts
Other components
Stearic acid: 2.0 parts
Butyl stearate: 6.0 parts
Polyisocyanate (CORONATE manufactured by Tosoh Corporation): 2.5 parts
Finishing Additive Solvent
Cyclohexanone: 200.0 parts
Methyl ethyl ketone: 200.0 parts (2) List of Non-Magnetic Layer Forming Composition
Non-magnetic inorganic powder: (α-iron oxide): 100.0 parts
Average particle size: 10 nm
Average aspect ratio: 1.9
BET (Brunauer-Emmett-Teller) specific surface area: 75 $m^2/g$
Carbon black (average particle size: 20 nm): 25.0 parts
$SO_3Na$ group-containing polyurethane resin: 18.0 parts
(Weight-average molecular weight: 70,000, $SO_3Na$ group: 0.2 meq/g)
Stearic acid: 1.0 part
Cyclohexanone: 300.0 parts
Methyl ethyl ketone: 300.0 parts (3) List of Back Coating Layer Forming Composition
Non-magnetic inorganic powder
α-iron oxide: 80.0 parts
Average particle size: 0.15 μm
Average aspect ratio: 7
BET specific surface area: 52 $m^2/g$
Carbon black (average particle size: 20 nm): 20.0 parts
Vinyl chloride copolymer: 13.0 parts
Sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts (4) Manufacturing of Magnetic Tape
Various components of the magnetic liquid were dispersed by using a batch type vertical sand mill for 24 hours to prepare a magnetic liquid. As dispersion beads, zirconia beads having a particle diameter of 0.5 mm were used.

The abrasive solution was prepared by dispersing various components of the abrasive solutions A and B with a batch type ultrasonic device (20 kHz, 300 W) for 24 hours.

The magnetic liquid and the abrasive solution obtained as described above were mixed with other components (silica sol, other components, and the finishing additive solvent) and subjected to treatment (ultrasonic dispersion) with a batch type ultrasonic device (20 kHz, 300 W) for 30 minutes. After that, the obtained mixture was filtered with a filter having a hole diameter of 0.5 μm, and a magnetic layer forming composition was prepared.

For the non-magnetic layer forming composition, the various components were dispersed by using a batch type vertical sand mill for 24 hours. As dispersion beads, zirconia beads having a bead diameter of 0.1 mm were used. The obtained dispersion liquid was filtered with a filter having a hole diameter of 0.5 μm and a non-magnetic layer forming composition was prepared.

For the back coating layer forming composition, the various components described above excluding the lubricant (stearic acid and butyl stearate), polyisocyanate, and 200.0 parts of cyclohexanone were kneaded and diluted by an open kneader. Then, the obtained mixed liquid was subjected to a dispersion process of 12 passes, with a transverse beads mill dispersing device by using zirconia beads having a particle diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The obtained dispersion liquid described above was filtered with a filter having a hole diameter of 1 μm and a back coating layer forming composition was prepared.

After that, the non-magnetic layer forming composition was applied and dried on a biaxial stretching polyethylene naphthalate support having a thickness of 5.0 μm so that a thickness after drying is 0.1 μm, and the magnetic layer forming composition was applied so that a thickness after drying is 70 nm, a coating layer was formed. While this coating layer is wet, a homeotropic alignment process was performed by applying a magnetic field having a magnetic field strength of 0.6 T in a direction vertical to the surface of the coating layer, and the coating layer was dried. After that, the back coating layer forming composition was applied to a surface of the support on a side opposite to the surface where the non-magnetic layer and the magnetic layer are formed, so that the thickness after drying becomes 0.4 μm, and dried, and accordingly, a back coating layer was formed.

Then, a surface smoothing treatment (calendar process) was performed with a calendar configured of only a metal roll, at a speed of 100 m/min, linear pressure of 294 kN/m, and a surface temperature of a calendar roll of 100° C., and the heating treatment was performed in the environment of the atmosphere temperature of 70° C. for 36 hours. After the heating treatment, the slitting was performed to have a width of ½ inches (1 inch is 0.0254 meters), and a magnetic tape was obtained.

Comparative Example 1

An ε-iron oxide powder was obtained in the same manner as in the producing of the ε-iron oxide powder of Example 1, except that gallium (III) nitrate octahydrate, cobalt (III) nitrate hexahydrate, and titanium (III) sulfate were not added, and the firing temperature was changed to 975° C.

A magnetic tape was obtained in the same manner as in Example 1, except that the ε-iron oxide powder obtained as described above was used as the ferromagnetic powder for forming the magnetic layer.

Example 2

A magnetic tape was obtained in the same manner as in Comparative Example 1, except that the firing temperature in the preparation of the ε-iron oxide powder was changed to 983° C.

Example 3

An ε-iron oxide powder was obtained in the same manner as in the producing of the ε-iron oxide powder of Example 1, except that the amount of gallium (III) nitrate octahydrate used was changed to 51 mg, cobalt (III) nitrate hexahydrate and titanium (III) sulfate were not included, and the firing temperature was changed to 991° C.

A magnetic tape was obtained in the same manner as in Example 1, except that the ε-iron oxide powder obtained as described above was used as the ferromagnetic powder for forming the magnetic layer.

Example 4

An ε-iron oxide powder was obtained in the same manner as in the producing of the ε-iron oxide powder of Example 1, except that the amount of gallium (III) nitrate octahydrate used was changed to 1.51 g, and the firing temperature was changed to 1045° C.

A magnetic tape was obtained in the same manner as in Example 1, except that the ε-iron oxide powder obtained as described above was used as the ferromagnetic powder for forming the magnetic layer.

Comparative Example 2

A magnetic tape was obtained in the same manner as in Example 4, except that the amount of gallium (III) nitrate octahydrate used was changed to 1.63 g, and the firing temperature was changed to 1052° C. in the producing of the ε-iron oxide powder.

Comparative Example 3

A magnetic tape was obtained in the same manner as in Example 1, except that the amount of the aluminum chloride aqueous solution added to the slurry for adhering the hydroxide of Al was changed to 4.9 g.

Example 5

A magnetic tape was obtained in the same manner as in Example 1, except that the amount of the aluminum chloride aqueous solution added to the slurry for adhering the hydroxide of Al was changed to 5.5 g.

Example 6

A magnetic tape was obtained in the same manner as in Example 1, except that the amount of the aluminum chloride aqueous solution added to the slurry for adhering the hydroxide of Al was changed to 12.3 g.

Comparative Example 4

A magnetic tape was obtained in the same manner as in Example 1, except that the amount of the aluminum chloride aqueous solution added to the slurry for adhering the hydroxide of Al was changed to 12.9 g.

Comparative Example 5

A magnetic tape was obtained in the same manner as in Example 1, except that the aluminum chloride aqueous solution added to the slurry for adhering the hydroxide of Al was changed to 6.6 g of an yttrium chloride aqueous solution.

Example 7

A magnetic tape was obtained in the same manner as in Comparative Example 5, except that the additive amount of the yttrium chloride aqueous solution was changed to 7.8 g.

Example 8

A magnetic tape was obtained in the same manner as in Example 7, except that the additive amount of the yttrium chloride aqueous solution was changed to 9.4 g.

Example 9

A magnetic tape was obtained in the same manner as in Example 7, except that the additive amount of the yttrium chloride aqueous solution was changed to 16.7 g.

Comparative Example 6

A magnetic tape was obtained in the same manner as in Example 7, except that the additive amount of the yttrium chloride aqueous solution was changed to 17.1 g.

Example 10

A magnetic tape was obtained in the same manner as in Example 1, except that an additive A was added in the producing of the magnetic liquid.

Example 11

A magnetic tape was obtained in the same manner as in Example 1, except that an additive B was added in the producing of the magnetic liquid.

Example 12

A magnetic tape was obtained in the same manner as in Example 8, except that an additive A was added in the producing of the magnetic liquid.

Example 13

A magnetic tape was obtained in the same manner as in Example 8, except that an additive B was added in the producing of the magnetic liquid.

Comparative Example 7

A magnetic tape was obtained in the same manner as in Example 1, except that 1.01 g of gallium (III) nitrate octahydrate used was changed to 0.33 g of aluminum (III) nitrate octahydrate and the adhering treatment of the hydroxide of Al was not performed in the producing of the ε-iron oxide powder.

The additive A shown in Table 1 is a polyethyleneimine derivative (J-1) (polyalkyleneimine chain-containing polymer) disclosed in a paragraph 0109 of JP2015-028830A.

The additive B shown in Table 1 is a polyalkyleneimine chain-containing polymer obtained by the following method.

In Table 1, in the examples in which the additive A or the additive B is shown in the column of the "additive A/B", the magnetic liquid was prepared by adding 30.0 parts of additive A or B.

Synthesis Method of Additive B
Synthesis of Intermediate P-1

45.0 g of propylene glycol monomethyl ether acetate (PGMEA; reaction solvent) was added to 500 mL three-neck flask under the nitrogen atmosphere. After increasing the liquid temperature to 75° C., 6.4 g of mercaptopropionic acid (MPA; thiol compound), 90.1 g of methyl methacrylate (MMA; vinyl monomer), 180.1 g of PGMEA (reaction solvent), and 0.14 g of dimethyl 2,2'-azobis (2-methylpropionate) (V-601 manufactured by Wako Pure Chemical Industries, Ltd.; polymerization initiator) were mixed with each other in advance and added dropwise for 2 hours. After the dropwise addition, 0.14 g of V-601 was added and stirred for 2 hours. In addition, the liquid temperature was increased to 90° C., and the mixture was stirred for 2 hours to obtain a PGMEA solution of the intermediate P-1 having the following structure. The mol number of MMA (vinyl monomer) used in the above is 15 mols with respect to 1 mol of MPA (thiol compound). The weight-average molecular weight of the intermediate P-1 synthesized here was 3,500.

Structure of Intermediate P-1

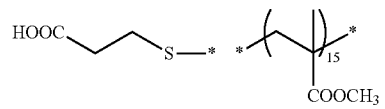

Synthesis of Additive B 2.4 g of polyalkyleneimine (SP-006 manufactured by Nippon Shokubai Co., Ltd., number average molecular weight of 600) and 144.8 g of the 30% PGMEA solution of the intermediate P-1 were mixed with each other and heated to the liquid temperature of 110° C. for 3 hours, and accordingly, a polymer including a polyalkyleneimine chain and a vinyl polymer chain (polyalkyleneimine chain-containing polymer) was obtained.

The above synthesis scheme is shown below. In the following synthesis scheme, a, b, and c each independently represent a polymerization molar ratio of a repeating unit, are 0 to 50, and a+b+c=100. k, l, m1, and m2 each independently represent a polymerization molar ratio of a repeating unit, k is 10 to 90, l is 0 to 80, m1 and m2 are each independently 0 to 70, and k+l+m1+m2=100. n represents a repeating unit and is 2 to 100.

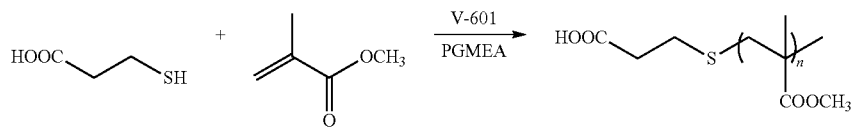

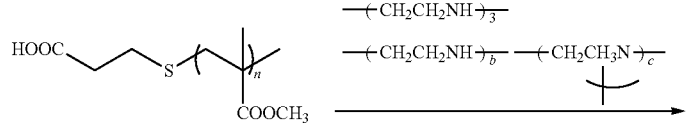

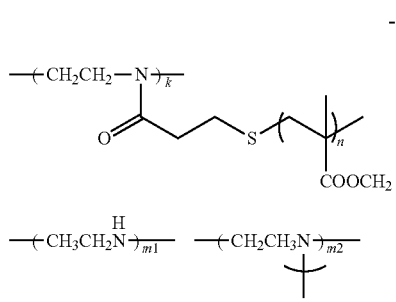
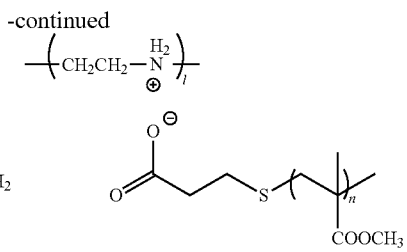

-continued

The reaction solution after the synthesis of the polymer was heated to a liquid temperature of 70° C., 0.4 g of phthalic anhydride was added and stirred for 1 hour, and accordingly, an acid-modified polyalkyleneimine chain-containing polymer (additive B) was synthesized. By the acid modification, one of the following partial structure which is a partial structure represented by Formula 1 is introduced per molecule in the additive B. A weight-average molecular weight of the additive B synthesized was 4,300, an amine value was 0.30 mmol/g, and an acid value was 0.59 mmol/g. The introduction of each synthesis raw material to the additive B finally synthesized at a ratio calculated from the used amount was confirmed by a measurement value of $^1$H-nuclear magnetic resonance (NMR), the weight-average molecular weight, an amine value, and an acid value.

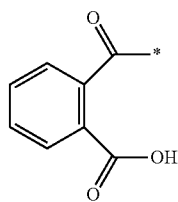 [SMILES: *C(=O)c1ccccc1C(=O)O]

Evaluation Method of ε-Iron Oxide Powder
(1) Average Particle Size
Regarding each ε-iron oxide powder in the examples and the comparative examples, an average particle size was obtained by the method described above using a transmission electron microscope H-9000 manufactured by Hitachi, Ltd. as the transmission electron microscope, and image analysis software KS-400 manufactured by Carl Zeiss as the image analysis software.

(2) Evaluation of Surface Layer Portion Content (With Respect to Bulk Iron Atom) of M Atom, Surface Layer Portion Content (With Respect to Surface Layer Portion Iron Atom) of M Atom, Bulk Content, and Uneven Distribution of M Atom in Surface Layer Portion, and Composition Analysis of ε-Iron Oxide Powder (i) Partial Dissolving
12 mg of a sample powder was collected from each ε-iron oxide powder of the examples and the comparative examples, and a beaker containing 12 mg of this sample powder and 10 ml of hydrochloric acid having a concentration of 1 mol/L was held on a hot plate at a set temperature of 70° C. for 1 hour, to obtain a solution in which a particle surface layer portion configuring the ε-iron oxide powder was dissolved (totally dissolved). The obtained solution was filtered with a membrane filter having a hole diameter of 0.1 μm. The element analysis of the filtrate obtained as described above was performed by an ICP analysis device.

(ii) Total Dissolving
12 mg of a sample powder was separately collected from each ε-iron oxide powder of the examples and the comparative examples, a beaker containing 12 mg of this sample powder and 10 ml of hydrochloric acid having a concentration of 4 mol/L was held on a hot plate at a set temperature of 80° C. for 3 hours, to obtain a solution in which the ε-iron oxide powder was dissolved (totally dissolved). The obtained solution was filtered with a membrane filter having a hole diameter of 0.1 μm. The element analysis of the filtrate obtained as described above was performed by an ICP analysis device.

(iii) Surface Layer Portion Content (With Respect to Bulk Iron Atom) of M Atom, Surface Layer Portion Content (With Respect to Surface Layer Portion Iron Atom) of M Atom, Bulk Content The surface layer portion content (with respect to bulk iron atom) of M atom was calculated as "(content of M atoms in the solution obtained by the partial dissolving in the section (i)/content of iron atoms in the solution obtained by the total dissolving in the section (ii))×100".

The content (bulk content) of the atom was calculated as "(content of M atoms in the solution obtained by the total dissolving in the section (ii)/content of iron atoms in the solution obtained by the total dissolving in the section (ii))×100".

The presence or absence of the uneven distribution of an M atom in a surface layer portion was evaluated based on a ratio of the surface layer portion content (with respect to bulk iron atom) obtained described above to the bulk content.

The surface layer portion content of the M atom (with respect to surface layer portion iron atom) was calculated as "(content of M atoms in the solution obtained by the partial dissolving in the section (i)/content of iron atoms in the solution obtained by the partial dissolving in the section (i))×100".

(iv) Composition Analysis of ε-Iron Oxide Powder
The quantity of a substitutional atom of the iron atoms was determined by the element analysis using the ICP analysis device regarding the solution obtained by the total dissolving in the section (ii), and the composition of the ε-iron oxide powder represented by a compositional formula $Ga_xCo_yTi_zFe_{(2-x-y-z)}O_3$ was specified from the quantitative result.

Evaluation of Electromagnetic Conversion Characteristics

A magnetic signal was recorded on each magnetic tape of the examples and the comparative examples in a tape longitudinal direction under the following conditions and reproduced with a magnetoresistive (MR) head. The reproduced signal was frequency-analyzed with a spectrum analyzer manufactured by Shibasoku Co., Ltd., and noise accumulated at 0 to 600 kfci was evaluated. The unit kfci is a unit of a linear recording density (cannot be converted into the unit SI). The electromagnetic conversion characteristics (initial stage of running) of each magnetic tape of the examples and the comparative examples was evaluated according to the following evaluation standard.

Recording and Reproduction Conditions
Recording: Recording track width 5 μm
Recording gap 0.17 μm
Head saturated magnetic flux density Bs 1.8 T
Reproduction: Reproduction track width 0.4 μm
Distance between shields (sh-sh distance) 0.08 μm
Evaluation standard
5: Substantially no noise, a signal is excellent, no error is observed.
4: A degree of noise is small and a signal is excellent.
3: Noise is observed. Signal is excellent.
2: A degree of noise is great and a signal is unclear.
1: Noise and signal cannot be distinguished or cannot be recorded.

In addition, each magnetic tape (length of 100 m) of the examples and the comparative examples was caused to repeatedly run 600 passes under the environment of the temperature of 37° C. and relative humidity of 87% at a running speed of 3 msec in a linear tester, to bring the surface of the magnetic layer and the magnetic head into contact with each other and slide on each other. The electromagnetic conversion characteristics (after repeated running) were evaluated by the same method as described above, after the repeated running.

The results of the above evaluation are shown in Table 1. In Comparative Example 1, a large number of scratches was observed on the surface of the magnetic layer after the repeated running, and accordingly, the evaluation of the electromagnetic conversion characteristics was not performed, and "-" was shown in the column of the electromagnetic conversion characteristics after repeated running of Table 1.

TABLE 1

| | Compositional formula $Ga_xCo_yTi_zFe_{(2-x-y-z)}O_3$ | | | M atom | | | | | | Electromagnetic conversion characteristics | |
|---|---|---|---|---|---|---|---|---|---|---|---|
| | | | | | | Surface layer portion content | Surface layer portion content | Surface layer portion content (with respect to surface layer | uneven distribution of M atom in surface | | Average particle size (nm) | Initial stage of running | After repeated running |
| | Ga x | Co y | Ti z | Kind | Bulk content | (with respect to bulk iron atom) | (with respect to bulk iron atom)/bulk content | portion iron atom) | layer portion | Additive A/B | | | |
| Example 1 | 0.20 | 0.05 | 0.05 | Al | 4.8 | 4.5 | 0.94 | 84 | Present | None | 11.3 | 4 | 4 |
| Comparative Example 1 | 0.00 | 0.00 | 0.00 | Al | 4.1 | 3.9 | 0.95 | 80 | Present | None | 4.7 | 1 | — |
| Example 2 | 0.00 | 0.00 | 0.00 | Al | 4.2 | 3.9 | 0.94 | 81 | Present | None | 5.7 | 3 | 3 |
| Example 3 | 0.10 | 0.00 | 0.00 | Al | 4.4 | 4.2 | 0.96 | 82 | Present | None | 9.0 | 4 | 4 |
| Example 4 | 0.30 | 0.05 | 0.05 | Al | 5.1 | 5.0 | 0.97 | 83 | Present | None | 15.3 | 4 | 4 |
| Comparative Example 2 | 0.32 | 0.05 | 0.05 | Al | 5.1 | 4.8 | 0.95 | 85 | Present | None | 17.4 | 2 | 2 |
| Comparative Example 3 | 0.20 | 0.05 | 0.05 | Al | 3.8 | 3.6 | 0.94 | 82 | Present | None | 11.4 | 3 | 1 |
| Example 5 | 0.20 | 0.05 | 0.05 | Al | 4.2 | 4.1 | 0.96 | 83 | Present | None | 11.3 | 3 | 3 |
| Example 6 | 0.20 | 0.05 | 0.05 | Al | 9.4 | 8.9 | 0.95 | 85 | Present | None | 11.3 | 3 | 4 |
| Comparative Example 4 | 0.20 | 0.05 | 0.05 | Al | 9.8 | 9.3 | 0.95 | 81 | Present | None | 11.4 | 2 | 3 |
| Comparative Example 5 | 0.20 | 0.05 | 0.05 | Y | 3.8 | 3.6 | 0.94 | 80 | Present | None | 11.4 | 3 | 1 |
| Example 7 | 0.20 | 0.05 | 0.05 | Y | 4.4 | 4.2 | 0.96 | 81 | Present | None | 11.3 | 3 | 3 |
| Example 8 | 0.20 | 0.05 | 0.05 | Y | 5.3 | 5.0 | 0.95 | 82 | Present | None | 11.4 | 4 | 4 |
| Example 9 | 0.20 | 0.05 | 0.05 | Y | 9.4 | 9.0 | 0.95 | 83 | Present | None | 11.3 | 3 | 4 |
| Comparative Example 6 | 0.20 | 0.05 | 0.05 | Y | 9.6 | 9.3 | 0.96 | 84 | Present | None | 11.5 | 2 | 3 |
| Example 10 | 0.20 | 0.05 | 0.05 | Al | 4.8 | 4.6 | 0.95 | 82 | Present | Additive A | 11.3 | 5 | 4 |
| Example 11 | 0.20 | 0.05 | 0.05 | Al | 4.8 | 4.6 | 0.96 | 83 | Present | Additive B | 11.3 | 5 | 5 |
| Example 12 | 0.20 | 0.05 | 0.05 | Y | 5.3 | 5.0 | 0.95 | 84 | Present | Additive A | 11.4 | 5 | 4 |
| Example 13 | 0.20 | 0.05 | 0.05 | Y | 5.3 | 5.1 | 0.96 | 85 | Present | Additive B | 11.4 | 5 | 5 |
| Comparative Example 7 | Al0.10 | 0.06 | 0.06 | Al | 4.9 | 0.1 | 0.03 | 4.8 | None | None | 11.4 | 3 | 2 |

From the results shown in Table 1, the magnetic tapes of Examples 1 to 13, excellent electromagnetic conversion characteristics can be observed both in the initial stage after the running and after the repeated running in the high temperature and high humidity environment.

One aspect of the invention is effective in a technical field of a magnetic recording medium for high-density recording.

What is claimed is:

1. An ε-iron oxide powder having an average particle size in a range of 5.0 to 16.0 nm, and
   an uneven distribution of an M atom in a surface layer portion,
   wherein the M atom is one or more kinds of atoms selected from the group consisting of an aluminum atom and an yttrium atom,
   a content of the M atom with respect to 100 atom % of iron atoms is in a range of 4.0 to 9.5 atom %, and
   the uneven distribution of an M atom in a surface layer portion indicates that a ratio of surface layer portion content (with respect to bulk iron atom)/bulk content is equal to or greater than 0.90,
   wherein the surface layer portion content (with respect to bulk iron atom) is a content of the M atom in a solution obtained by partially dissolving the ε-iron oxide powder with acid with respect to 100 atom % of iron atom in a solution obtained by totally dissolving the ε-iron oxide powder with acid, and
   the bulk content is a content of the M atom in a solution obtained by totally dissolving the ε-iron oxide powder with acid with respect to 100 atom % of iron atom in a solution obtained by totally dissolving the ε-iron oxide powder with acid.

2. The ε-iron oxide powder according to claim 1, wherein the content of the M atom is in a range of 4.3 to 8.0 atom %.

3. The ε-iron oxide powder according to claim 1, wherein the average particle size is in a range of 6.0 to 16.0 nm.

4. The ε-iron oxide powder according to claim 1, further comprising:
   one or more kinds of atoms selected from the group consisting of a gallium atom, a cobalt atom, and a titanium atom.

5. The ε-iron oxide powder according to claim 1, wherein at least an aluminum atom is included as the M atom.

6. The ε-iron oxide powder according to claim 1, wherein at least an yttrium atom is included as the M atom.

7. The ε-iron oxide powder according to claim 1, which is a ferromagnetic powder for magnetic recording.

8. A magnetic recording medium comprising:
   a non-magnetic support; and
   a magnetic layer including a ferromagnetic powder,
   wherein the ferromagnetic powder is the ε-iron oxide powder according to claim 1.

9. The magnetic recording medium according to claim 8, further comprising:
   a nitrogen-containing polymer in the magnetic layer.

10. The magnetic recording medium according to claim 8, further comprising:
    a non-magnetic layer including a non-magnetic powder between the non-magnetic support and the magnetic layer.

11. The magnetic recording medium according to claim 8, further comprising:
    a back coating layer including a non-magnetic powder on a surface of the non-magnetic support opposite to a surface provided with the magnetic layer.

12. The magnetic recording medium according to claim 8, wherein the content of the M atom of the ε-iron oxide powder is in a range of 4.3 to 8.0 atom %.

13. The magnetic recording medium according to claim 8, wherein the average particle size of the ε-iron oxide powder is in a range of 6.0 to 16.0 nm.

14. The magnetic recording medium according to claim 8, wherein the ε-iron oxide powder further comprises one or more kinds of atoms selected from the group consisting of a gallium atom, a cobalt atom, and a titanium atom.

15. The magnetic recording medium according to claim 8, wherein the ε-iron oxide powder includes at least an aluminum atom as the M atom.

16. The magnetic recording medium according to claim 8, wherein the ε-iron oxide powder includes at least an yttrium atom is included as the M atom.

17. A magnetic recording and reproducing device comprising:
    the magnetic recording medium according to claim 8; and
    a magnetic head.

18. A composition comprising:
    the ε-iron oxide powder according to claim 1.

19. The composition according to claim 18, further comprising:
    a binding agent.

20. The ε-iron oxide powder according to claim 1, wherein the average particle size of the ε-iron oxide powder ranges from 5.7 nm to 15.3 nm and the content of the M atom with respect to 100 atom % of iron atoms is in a range of 4.2 atom % to 9.4 atom %.

* * * * *